United States Patent
Holm et al.

(10) Patent No.: US 7,496,692 B2
(45) Date of Patent: Feb. 24, 2009

(54) VALIDATING CHIP CONFIGURATION DATA

(75) Inventors: Ingemar Holm, Stuttgart (DE); Ralph C. Koester, Tuebingen (DE); John S. Liberty, Round Rock, TX (US); Mack W. Riley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 11/252,533

(22) Filed: Oct. 18, 2005

(65) Prior Publication Data

US 2007/0094420 A1 Apr. 26, 2007

(51) Int. Cl.
*G06F 21/02* (2006.01)
(52) U.S. Cl. ........................................................ 710/8
(58) Field of Classification Search ................ 710/8
See application file for complete search history.

(56) References Cited

U.S. PATENT DOCUMENTS

2004/0034763 A1* 2/2004 McCardle ...................... 713/1
2006/0179302 A1* 8/2006 Hatakeyama ............... 713/164

* cited by examiner

*Primary Examiner*—Henry W. H. Tsai
*Assistant Examiner*—Hyun Nam
(74) *Attorney, Agent, or Firm*—Francis Lammes; Stephen J. Walder, Jr.; Matthew B. Talpis

(57) ABSTRACT

Verifying configuration data for configuring a microprocessor or system-on-a-chip (SoC) is provided. During initialization, configuration data is shifted into the microprocessor or SoC through a configuration input. The configuration data is shifted to all of the on-chip processor units to provide initial settings for configuration latches in the design. While the configuration data is being shifted to the on-chip processor units, a copy of the configuration data is also stored in a local storage of a test control unit. A private interface is provided between the test control unit and the processor units. Via the private interface, a processor unit receives the current configuration data for the processor units. The current configuration data is compared against the original configuration data stored in the test control unit to verify the current configuration of the processor units.

10 Claims, 2 Drawing Sheets

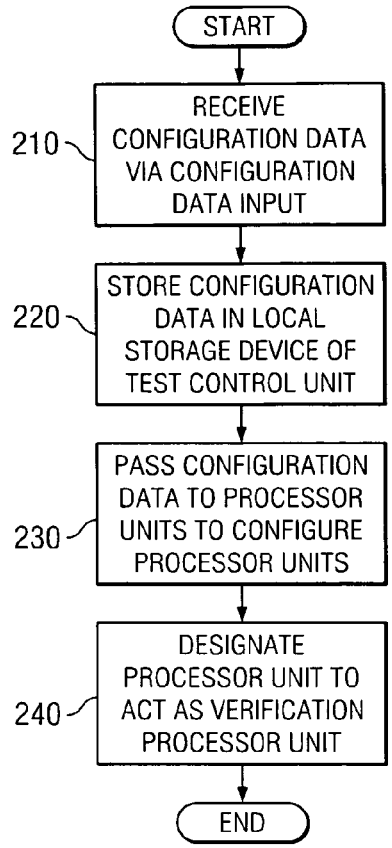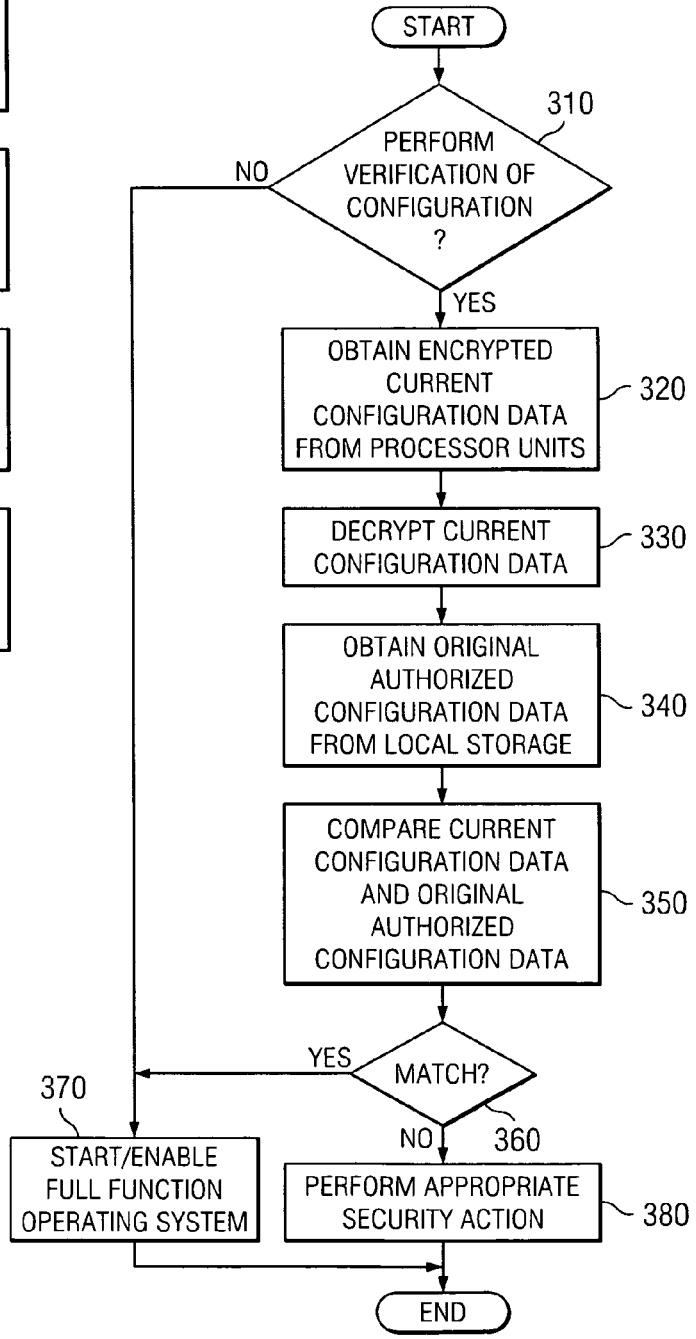

VALIDATING CHIP CONFIGURATION DATA

BACKGROUND OF THE INVENTION

1. Technical Field

The present invention relates generally to an improved data processing system. More specifically, the present invention is directed to an improved system and method for validating chip configuration data.

2. Description of Related Art

In modern microprocessors or systems-on-a-chip, configuration data is shifted into the processor units on-chip upon initialization, such as from an external storage device. The configuration data is shifted to all the on-chip processor units to provide initial settings for configuration latches in the design.

Shifting of the configuration data occurs at a predefined safe period of the initialization process. Once the data has been shifted into the on-chip microprocessor units, it cannot be verified by a single entity without disrupting the operation of the microprocessor.

Typically, cyclical redundancy checking (CRC) code values are used to ensure the accuracy of the configuration data being shifted into the processor units of the microprocessor. CRC is an error checking technique for ensuring the accuracy of digital data in which the data is divided into predetermined lengths which, used as dividends, are divided by a fixed divisor. The remainder of the calculation is appended onto the data being shifted into the microprocessor. At the receiving end, i.e. at the microprocessor, the remainder is calculated. If the calculated remainder does not match the remainder provided to the microprocessor with the configuration data, an error is detected.

CRC validation leaves a possibility for tampering. That is, unauthorized configuration data may be generated for shifting into the microprocessor which may result in the same CRC code, i.e. CRC remainder. Thus, it is conceivable that a microprocessor or system-on-a-chip (SoC) may become corrupted by unauthorized configuration data being shifted into microprocessor or SoC even though CRC validation is utilized.

SUMMARY OF THE INVENTION

In view of the above, it would be beneficial to have a system and method for validating configuration data shifted into a microprocessor or system-on-a-chip which does not leave a possibility for tampering. That is, it would be beneficial to have a system and method that prevents false or unauthorized configuration data from being shifted into a microprocessor or system-on-a-chip and being utilized to configure the processor units on the chip.

The present invention provides a system and method for verifying configuration data for configuring a microprocessor or system-on-a-chip (SoC). With the system and method of the present invention, during initialization of the microprocessor or SoC, configuration data is shifted into the microprocessor or SoC through a configuration input. The configuration data may have, as its source, an external storage device, e.g., a Read Only Memory (ROM), an external system control unit, or the like. The configuration data is shifted to all of the on-chip processor units to provide initial settings for configuration latches in the design.

While the configuration data is being shifted to the on-chip processor units, a copy of the configuration data is also stored in a local storage of an on-chip test control unit. Once the configuration data is shifted into the processor units, it cannot be verified without disrupting the operation of the microprocessor or SoC. The local storage device inside the test control unit is used to alleviate the problem of being able to inspect the configuration data after the data has been shifted into the processor units.

The shifting of the configuration data may be performed via a configuration ring that couples the processor units, the test control unit, a processor complex, a memory interface and a bus interface. A second, private, interface is provided between the test control unit and the processor units. In this way, via the private interface, a processor unit may be designated as a verification processor unit which receives an encoded version of all of the current configuration data for the processor units. This encoded version of the current configuration data is compared against the original authorized configuration data stored in the test control unit to verify that the configuration data currently being used to configure the processor units is the authentic configuration data shifted into the microprocessor or SoC.

In one exemplary embodiment of the present invention, a method, computer program product, and apparatus are provided in which configuration data for at least one processor unit of a data processing device is received and the at least one processor unit of the data processing device is configured based on the configuration data. A copy of the configuration data is stored in a local storage of a test control unit in the data processing device. The configuration of the at least one processor unit may be verified based on the stored copy of the configuration data in the local storage of the data processing device. The data processing system may be, for example, a microprocessor chip and the method may be implemented on the microprocessor chip.

The mechanisms of the present invention may further include designating one of the at least one processor unit as a verification processor unit, wherein the verification processor unit performs verification of the configuration of the at least one processor unit. The verification of the configuration of the at least one processor unit may include providing the current configuration data for the at least one processor unit to the verification processor unit, providing, from the local storage of the test control unit, the copy of the configuration data to the verification processor unit, and then comparing the current configuration data to the copy of the configuration data. The configuration of the at least one processor unit may thus, be verified based on results of the comparison.

In providing the copy of the configuration data to the verification processor unit, the copy of the configuration data may be transmitted to the verification processor unit across a private interface that couples the test control unit with the at least one processor unit. Furthermore, when configuring the at least one processor unit of the data processing device based on the configuration data, the configuration data may be transmitted to the at least one processor unit across a non-private configuration ring interface separate from the private interface.

Moreover, when comparing the current configuration data to the copy of the configuration data, a bit by bit comparison may be performed between the current configuration data and the copy of the configuration data, wherein if one bit of the current configuration data does not match a corresponding bit in the copy of the configuration data, then the configuration of the at least one processor unit is determined to be not valid.

In addition to the above, the mechanisms of the present invention may further include enabling full functioning of an operating system in response to the configuration of the at least one processor unit being verified as valid. Moreover, the present invention may further include performing a security action in response to the configuration of the at least one processor unit being verified as not valid. The security action may be one or more of disabling a processor unit, generating an error message, generating an error log entry, or reconfiguring a processor unit based on the copy of configuration data.

In an exemplary embodiment of the present invention, the apparatus of the present invention may be, for example, a microprocessor. The microprocessor may comprise at least one processor unit, a test control unit, a configuration ring interface, and a separate private interface, for example.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a flowchart outlining an exemplary operation of the present invention when configuring a microprocessor or SoC, such as the microprocessor shown in FIG. 1; and FIG. 3 is a flowchart outlining an exemplary operation of the present invention when verifying configuration data used to configure a microprocessor.

DETAILED DESCRIPTION OF THE PREFERRED EMBODIMENTS

Figure 1:
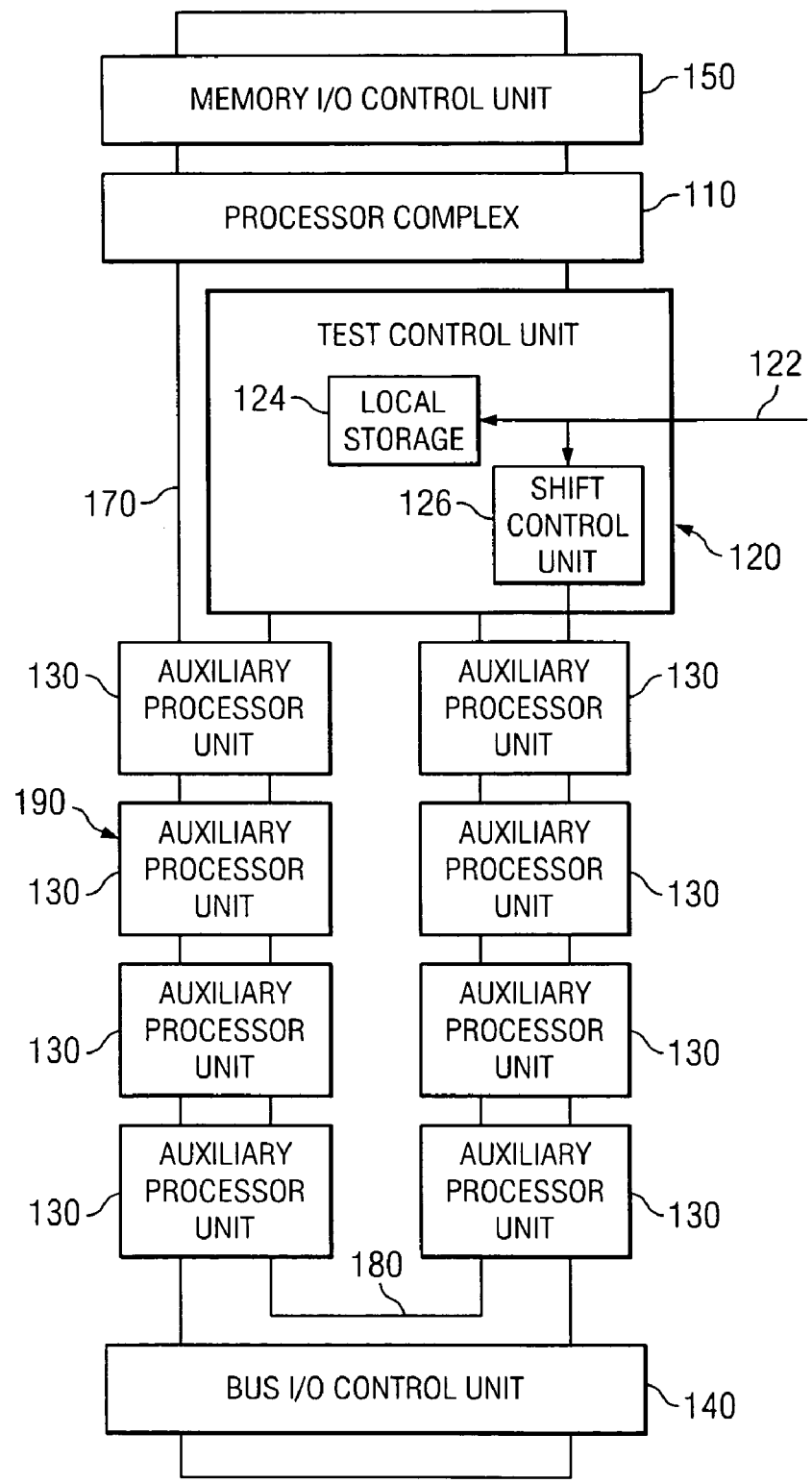
FIG. 1 is a block diagram of a microprocessor in accordance with one exemplary embodiment of the present invention.

As mentioned above, the present invention is directed to a system and method for verifying chip configuration data. The invention can take the form of an entirely hardware embodiment or an embodiment containing both hardware and software elements. In a preferred embodiment, the invention is implemented in a combination of hardware and software, which includes but is not limited to firmware, resident software, microcode, etc.

Furthermore, aspects of the present invention may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. With reference now to the figures, FIG. 1 is a block diagram of a microprocessor in accordance with one exemplary embodiment of the present invention. As shown in FIG. 1, the microprocessor 100 includes a processor complex 110, a test control unit 120, a plurality of auxiliary processor units 130, a bus Input/Output (I/O) control unit 140, and a memory I/O control unit 150. The processor complex 110 provides a centralized processor and supporting units for controlling the auxiliary processors 130. The test control unit 120 has a configuration data input 122, local storage device 124, and shift control unit 126. The bus I/O control unit 140 may be a PCI bus interface unit or other type of communication interface, for example. The memory I/O control unit 150 may be a memory controller coupled to a local or main memory, for example.

The auxiliary processor units 130, the test control unit 120, processor complex 110, and bus and memory I/O control units 140 and 150 are coupled via configuration ring interface 170. In one exemplary embodiment, the auxiliary processors are arranged in series along the configuration ring interface 170. The configuration ring interface 170 provides a means by which the configuration data provided to the test control unit 120 may be shifted into each auxiliary processor unit 130 one after the other.

In addition, the auxiliary processors 130 are coupled to one another and the test control unit 120 via a private serial interface 180. Again, the auxiliary processor units 130 may be arranged in series along the private serial interface 180. The private serial interface 180 provides a means by which one or more of the auxiliary processor units 130 may verify the configuration data shifted into the local storage device 124. The configuration ring interface 170 and private serial interface 180 may be a custom scan design or industry standard serial interface, such as I$^2$C or SPI, for example.

Although FIG. 1 illustrates a microprocessor device 100 having multiple auxiliary processor units and a processor complex, the present invention is not limited to the particular configuration shown in FIG. 1. To the contrary, with the present invention all that is necessary is that the microprocessor includes one processor unit and a test control unit having a local storage for storing configuration data input to the test control unit. Thus, the present invention may be implemented on a plurality of different types of microprocessor or system-on-a-chip designs.

With the system and method of the present invention, during initialization of the microprocessor 100 or SoC, configuration data is shifted into the microprocessor 100 or SoC through the configuration data input 122. The configuration data may have, as its source, an external storage device, e.g., a Read Only Memory (ROM), an external system control unit, or the like (not shown). The configuration data is shifted to all of the on-chip auxiliary processor units 130 to provide initial settings for configuration latches within the auxiliary processor units 130 in the microprocessor 100. The configuration data may include such information, for example, as the initial address for the operating system, information regarding allocated address spaces, which auxiliary processor devices are enabled and/or disabled, and other types of configuration information for configuring the auxiliary processor units 130.

While the configuration data is being shifted to the on-chip auxiliary processor units 130, a copy of the configuration data is also stored in the local storage 124 of the test control unit 120. Once the configuration data is shifted into the auxiliary processor units 130, it typically cannot be verified without disrupting the operation of the microprocessor 100 or SoC. The local storage device 124 inside the test control unit 120 is used to alleviate the problem of being able to inspect the configuration data after the data has been shifted into the auxiliary processor units 130. The shifting of the configuration data may be performed via the configuration ring interface 170 that couples the auxiliary processor units 130, the test control unit 120, the processor complex 110, memory I/O control unit 150 and a bus I/O control unit 140. Shifting of the configuration data through the configuration ring interface 170 may be performed under the control of shift control unit 126, for example.

The private serial interface 180 is provided between the test control unit 120 and the auxiliary processor units 130. In this way, via the private serial interface 180, an auxiliary processor unit 190 may be designated as a verification processor unit 190 which receives an encoded version of all of the configuration data for the auxiliary processor units 130. The designation of the verification processor unit 190 may be hardwired into the test control unit 120, may be designated in the configuration data itself, or the like.

The verification processor unit 190 may interrogate or otherwise obtain the current configuration data for each auxiliary processor 130 via the private serial interface 180. This encoded configuration data from the other auxiliary processor units 130 is stored in the local storage device 124. This stored data may then be compared against the configuration data that is embedded in the software that is loaded from the bus I/O control unit 140. The software from the bus I/O control unit 140 may reside on an external hard file or memory device, for example.

The embedded configuration data in the software is compared to the data stored in the local storage device 124 of the test control unit 120 to ensure that the auxiliary processor units 130 are configured according to the authorized configuration data passed into the microprocessor 100 or SoC via the configuration data input 122. Such a comparison may be, for example, a bit by bit comparison between the original configuration data stored in the local storage device 124 with the configuration data embedded in the software obtained by the verification processor 190.

The logic for performing such verification may be provided in firmware on the verification processor unit 190, in an operating system executed by the verification processor unit 190, an application executing on the verification processor unit 190, or the like. The logic of the verification processor unit 190 for verifying the configuration of the auxiliary processor units 130 may be executed immediately after configuration of the auxiliary processor units 130, for example to ensure that the auxiliary processor units 130 are configured in accordance with the original configuration data passed into the microprocessor 100 or SoC.

If during verification, it is determined that the current configuration of an auxiliary processor unit 130 does not match the configuration specified in the original configuration data passed into the microprocessor 100 or SoC, as determined from the configuration data stored in the local storage device 124 of the test control unit 120, then appropriate security action may be taken. The particular actions to be taken depend upon the level of security desired for the microprocessor 100, SoC, or system as a whole. For example, the verification logic in the verification processor unit 190 may disable the auxiliary processor unit 130 that has been corrupted, generate an error message and/or log entry, reconfigure the auxiliary processor unit 130 based on the original configuration data stored in the local storage device 124, or the like.

A mismatch between current configuration data and the original configuration data stored in the local storage device 124 may have various causes including malicious tampering with the configuration of the auxiliary processor unit to cause the auxiliary processor units to execute different software than was originally intended by the authorized original configuration data. In this way, a malicious party or malicious software may gain access to an otherwise secure computing system environment and perform any of a number of unwanted actions. For example, a malicious party or malicious software may tamper with the configuration data by changing the start address for some of the auxiliary processor units 130 on the microprocessor 100. If their address is changed, then the auxiliary processor units 130 could execute incorrect software (e.g. software provided by a hacker). With the mechanisms of the present invention, corruption of the configuration data of the auxiliary processors either by malicious means or unintentional data corruption may be detected and appropriate action taken so as to avoid improper operation of the microprocessor 100 or SoC.

The present invention provides an improvement over the prior art mechanisms in that a copy of the original authorized configuration data that was passed into the microprocessor 100 or SoC is maintained in a local storage device 124 of a test control unit 120. Thus, the actual configuration information of each auxiliary processor unit 130 may be compared against its actual original configuration data stored in the local storage device 124. As a result, the problems associated with using CRCs, i.e. the ability to have different data that generates the same CRC, are avoided by the mechanisms of the present invention.

In addition, the private interface 180 of the present invention provides an additional level of security. The private interface 180 effectively limits the number of auxiliary processor units 130 that can access the local storage device 124. By designating one of the auxiliary processor units 130 as the verification processor, the other auxiliary processor units 130 can not be used to perform malicious acts relative to validation of the configuration data. It should be appreciated, however, that embodiments of the present invention in which such security is not believed necessary, may eliminate the private interface 180 with all data shifting and verification being done by way of the configuration ring interface 170, for example.

FIGS. 2 and 3 provide flowcharts outlining exemplary operations in accordance with the exemplary embodiment of the present invention. It will be understood that each block, and combination of blocks, of the flowchart illustrations in FIGS. 2 and 3 can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 2 is a flowchart outlining an exemplary operation of the present invention when configuring a microprocessor or SoC, such as the microprocessor 100 shown in FIG. 1. As shown in FIG. 2, the operation starts by receiving configuration data via a configuration data input (step 210). The configuration data is stored in a local storage device within a test control unit of the microprocessor or SoC (step 220). The configuration data is also passed to each processor unit so as to configure the processor unit (step 230). A processor unit is designated the verification processor unit (step 240), such as based on hardwired or configuration data specified information identifying which processor unit is to act as the verification processor unit. The operation then ends.

FIG. 3 is a flowchart outlining an exemplary operation of the present invention when verifying configuration data used to configure a microprocessor or SoC. As shown in FIG. 3, following configuration of the microprocessor or SoC, a determination is made as to whether verification of the configuration of the processor units is to be performed (step 310). If verification is to be performed, encrypted configuration data is loaded, such as via the bus I/O control unit 140, for example (step 320). The loaded encrypted configuration data is then decrypted to obtain current configuration data (step 330). The original configuration data is retrieved from the local storage device in the test control unit via the private interface (step 340). The original configuration data and the current configuration data are then compared (step 350).

A determination is then made as to whether the current and original configuration data match (step 360). If there is a match, or if verification is not required, the configuration of the processor units is verified and the full operating system is enabled (step 370). If the configuration data does not match, then appropriate security action may be taken to avoid corruption of the microprocessor or SoC (step 380). The operation then ends.

Because the present invention stores a copy of the original authorized configuration data within a test control unit of the microprocessor or SoC, verification may be performed against the actual original authorized configuration data on a bit by bit basis. As a result, the possibility of corrupting the configuration of the processor units of the microprocessor or SoC using configuration data that results in the same CRC as original authorized configuration data is avoided. Thus, the present invention provides a much more secure microprocessor, SoC, or other multi-processor unit, with regard to configuration data, than is possible with prior art mechanisms.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing device, for ensuring a configuration of processor units of the data processing device, comprising:

receiving original configuration data for at least one processor unit of the data processing device;

storing a copy of the original configuration data in a local storage of a test unit in the data processing device via only a non-private configuration ring communication interface;

transmitting a copy of the original configuration data to the at least one processor unit via only the non-private configuration ring communication interface;

configuring the at least one processor unit of the data processing device based on the copy of the original configuration data;

responsive to the at least one processor unit being configured, interrogating the at least one processor unit for a copy of current configuration data via only a private serial communication interface;

storing the copy of the current configuration data in the local storage of the test control unit in the data processing device; and verifying a configuration of the at least one processor unit based on the copy of the original configuration data stored in the local storage of the data processing device, wherein verifying the configuration of the at least one processor unit comprises comparing the copy of the current configuration data to the copy of the original configuration data and wherein the non-private configuration ring communication interface is separate from the private serial communication interface.

2. The method of claim 1, further comprising:

designating one of the at least one processor unit as a verification processor unit, wherein the verification processor unit performs verification of the configuration of the at least one processor unit.

3. The method of claim 2, wherein verifying the configuration of the at least one processor unit further comprises:

providing the copy of the current configuration data for the at least one processor unit to the verification processor unit;

providing, from the local storage of the test control unit, the copy of the original configuration data to the verification processor unit; and verifying the configuration of the at least one processor unit based on results of the comparison.

4. The method of claim 3, wherein providing the copy of the current configuration data to the verification processor unit includes transmitting the copy of the current configuration data to the verification processor unit across the private serial communication interface that couples the test control unit with the at least one processor unit.

5. The method of claim 4, wherein configuring the at least one processor unit of the data processing device based on the copy of the original configuration data comprises transmitting the copy of the original configuration data to the at least one processor unit across the non-private configuration ring communication interface.

6. The method of claim 3, wherein comparing the copy of the current configuration data to the copy of the original configuration data comprises performing a bit by bit comparison of the copy of the current configuration data to the copy of the original configuration data, wherein if one bit of the copy of the current configuration data does not match a corresponding bit in the copy of the original configuration data, then the configuration of the at least one processor unit is determined to be not valid.

7. The method of claim 1, further comprising:

enabling full functioning of an operating system in response to the configuration of the at least one processor unit being verified as valid.

8. The method of claim 1, further comprising:

performing a security action in response to the configuration of the at least one processor unit being verified as not valid.

9. The method of claim 8, wherein the security action is at least one of disabling a processor unit, generating an error message, generating an error log entry, or reconfiguring the processor unit based on the copy of configuration data.

10. The method of claim 1, wherein the data processing device is a microprocessor chip and the method is implemented on the microprocessor chip.

* * * * *